Aug. 3, 1954

A. J. DEYRUP ET AL 2,685,346

METAL VAPOR SEPARATION

Filed June 27, 1951

INVENTORS
ALDEN J. DEYRUP & JAMES J. KNOX
BY
James H. Ryan
ATTORNEY

Patented Aug. 3, 1954

2,685,346

UNITED STATES PATENT OFFICE 2,685,346

METAL VAPOR SEPARATION

Alden J. Deyrup, Niagara Falls, N. Y., and James J. Knox, Avenel, N. J., assignors to E. I. du Pont de Nemours & Company, Wilmington, Del., a corporation of Delaware Application June 27, 1951, Serial No. 233,950

12 Claims. (Cl. 183—115)

This invention relates to the separation of metallic vapors from gaseous mixtures and is particularly adapted to separate metals from such mixtures wherein gaseous constituents tend to react with the metals on cooling to condense the metallic vapors. An example is the separation of sodium from the mixture of carbon monoxide and sodium vapor formed by reacting carbon with a sodium compound such as sodium carbonate or sodium hydroxide.

In the manufacture of sodium by the carbon reduction of sodium carbonate at temperatures around 1100° C., the reaction product is a gaseous mixture of sodium vapor and carbon monoxide, which is cooled to condense out the sodium. Successful operation of this process requires a sudden and rapid cooling and condensation of sodium, since if the gaseous mixture is cooled too slowly, a large part of the sodium vapor reacts with the carbon monoxide to form carbon and sodium carbonate, thus decreasing the yield. Heretofore it has not been found possible to obtain adequate yields of sodium by this process because of this reversion reaction.

In previous attempts to improve the carbonate reduction process for the manufacture of sodium, various means have been proposed for rapidly cooling the reaction mixture to condense out the sodium. Proposed cooling means have included cooled surfaces, large volumes of cooling gases rapidly mixed with the reactant off-gases and liquid coolants such as molten lead or molten tin. For example, in the process of McConica et al. U. S. P. 2,391,728, the reaction off-gases from the carbon reduction of sodium carbonate are rapidly brought into contact with a shower of molten lead, whereby the gases are suddenly cooled to below the temperature of the reversion reaction and the sodium vapor is condensed and dissolved in the molten lead. The resulting sodium lead alloy then may be distilled, e. g., under vacuum to recover sodium therefrom. This method has the obvious disadvantage of requiring large quantities of molten metal, power to pump the same and additional heat to distill out sodium from the cooled lead alloy.

An object of the present invention is the separation of a metallic vapor from a mixture thereof with other vapors or gases. A particular object is the separation of sodium from the mixture of sodium vapor and carbon monoxide resulting from sodium carbonate reduction while preventing or minimizing reaction between the carbon monoxide and sodium. Still further objects include the separation of sodium and other metallic vapors from gaseous mixtures for various purposes. Our invention also includes means for accomplishing this result and a method for constructing such means.

The above stated objects may be attained in accordance with the present invention by passing a gaseous mixture containing a metallic vapor at a temperature below 1200° C. through a bed of a granular refractory material, chemically inert to the constituents of said mixture, there being distributed throughout said bed droplets of molten tin. The molten metal droplets absorb the metallic constituent from the gas mixture, thus removing the metallic constituent from the mixture.

One utilization of this invention is the removal of sodium from a mixture of carbon monoxide and sodium vapor by absorption of the sodium in molten tin at a temperature of 900 to 1200° C., in accordance with the process described and claimed in the application for Letters Patent by A. J. Deyrup, Serial No. 233,949, filed of even date herewith. In this utilization, carbon is reacted with a sodium compound such as soda ash or caustic soda at a temperature of 1100 to 1200° C. and the resulting gaseous mixture containing carbon monoxide and sodium vapor is passed through a bed of granular refractory containing droplets of molten tin distributed therein at a temperature of 900 to 1200° C. The tin absorbs sodium from the gaseous mixture, and residual carbon monoxide passes out from the bed. As the temperature of the gaseous mixture in contact with the molten tin is above that at which the reversion reaction occurs, little or no reaction occurs between the sodium and carbon monoxide. After the tin has become substantially saturated with sodium, forming an alloy containing 1 to 7% by weight of sodium, the sodium may be removed from the molten alloy by passing in contact therewith an inert gas such as nitrogen, which removes the bulk of the sodium from the sodium tin alloy at a temperature above the boiling point of the sodium; and the resulting mixture of nitrogen and sodium vapor may be cooled to condense out liquid sodium in a substantially pure state. The practice of our invention may be understood in more detail from the examples given below and from the appended drawings in which:

Figure 1:
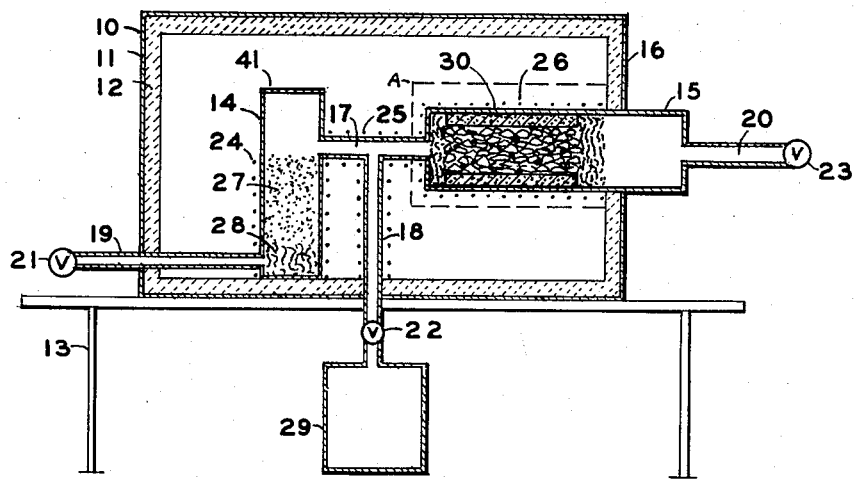
Figure 1 is a section of heating means appropriate for carrying out the process of the invention.

Figure 1 shows a furnace 10 with a conventional steel casing 11 and a refractory lining 12 resting upon a support 13. Within the furnace 10 are disposed iron retort 14 with a removable top 41 and cylindrical absorber 15, the retort standing upon the floor of the furnace. The absorber passes through one wall 16 of the furnace and is supported thereby. Between retort 14 and absorber 15 extends a short connecting pipe 17 which has a branch 18 extending downwards through the floor of the furnace. Pipe 19 leads into furnace 10 and is connected to the lower part of retort 14. Pipe 20 is joined to the end of absorber 15 extending outside the furnace. The valves 21, 22 and 23 are provided for the control of fluid flow in the respective pipes 18, 19 and 20. Resistance wiring sets 24, 25 and 26 supply heat to the retort 14, pipes 17 and 18 and absorber 15. Each set of this wiring may possess separate rheostat controls (not shown) of conventional design for greater flexibility in operation. Within retort 14 is placed the reactants 27 prevented from clogging pipe 19 by steel wool 28. Receiver 29 is connected to the lower end of pipe 18 to catch evolved reaction products. The furnace may be made demountable in construction or conventional doors may be placed to provide easy access to the interior thereof.

Figure 2:
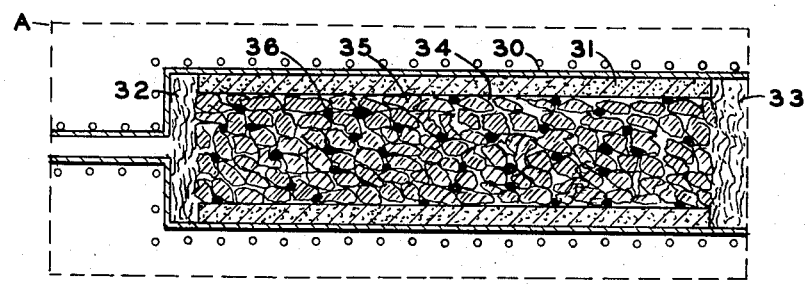
Figure 2 is an enlargement of the part of Figure 1 shown within broken lines and lettered "A"
Figure 3:
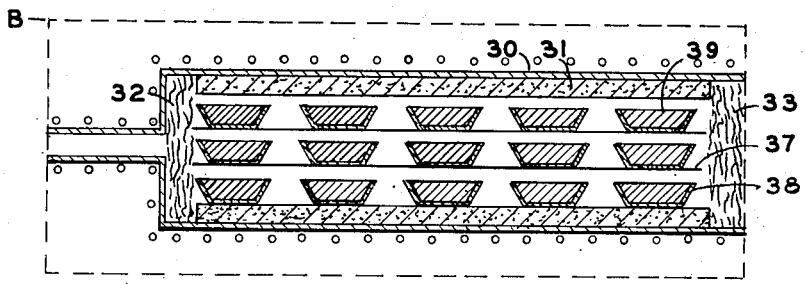
Figure 3 represents an alternative embodiment, lettered "B," of that part of Figure 1 lettered "A." B may be directly substituted for A in Figure 1.

Details of absorber 15 are shown more clearly by Figures 2 and 3. In all three figures it should be noted that the same numerals represent identical elements. Absorber 15 consists of a cylindrical iron shell 30 upon which is wound externally resistance wiring 26 covering that portion of the absorber within furnace 10. Held within and coaxial with shell 30 is lining 31 formed of a refractory such as graphite, silicon carbide or Alundum. This lining 31 is necessary only for that portion of the shell 30 within the furnace. The ends of the lining 31 are preferably closed loosely by means of steel wool 32 and 33. In embodiment A, the interior of the lining 31 is shown loosely filled with a refractory bed 34. This bed preferably consists of an irregular mass of particles 35 of silicon carbide containing about 20% by weight of discrete particles 36 of tin. At a sufficiently high temperature the tin particles melt and serve as the preferred absorbent medium for this invention. Alternative embodiment B shows the lining 31 carrying a support 37 upon which rests a plurality of open shallow graphite or Alundum crucibles 38 designed to carry molten tin 39.

Other conventional designs can be utilized for the absorber as desired but any embodiment employed should be easy to remove and fill. Well-known counter-current or co-current arrangements may, for example, serve as additional convenient alternatives for the apparatus described. In addition the physical arrangement of both the retort and the absorber within the furnace may be varied. For example, instead of being disposed horizontally the absorber may be held vertically in the furnace. Consequently we do not wish to be bound by detials of apparatus other than as claimed.

The operation of the apparatus shown is believed evident from the description. The reactants, coke and soda ash powdered and mixed together, are charged into the retort 14. Retort 14, pipe 17 and absorber 15 are then heated to the reaction temperature and a stream of nitrogen passed slowly through the system from valve 21 to valve 23, valve 22 being kept closed. Sodium is absorbed in the tin within the absorber during the reaction time. When it is desired to stop the reaction and collect the sodium the retort is cooled, valve 21 is closed and valve 22 is opened. A stream of nitrogen is then passed through the absorber in reverse direction through valve 23. The reversed nitrogen stream entrains sodium and carries it out into the cool receiver 29 where it condenses. A fourth valve (not shown) may be provided in pipe 17 to prevent any sodium from being carried back into the retort. This fourth valve is however unnecessary since gas pressure within the retort effectively prevents entry of the moving nitrogen stream and additionally creates the problem of maintaining an operative valve at high temperatures.

The following examples illustrate the invention in practice:

*Example 1*

An iron retort was arranged with a short connection to one end of a horizontal cylindrical iron tube, the tube being designated as the "absorber." The retort, connection to the absorber, and the end of the absorber adjacent to the retort were enclosed in a conventional furnace setting, with the opposite end of the absorber extending outside the furnace. A section of the absorber, at the end inside the furnace was filled with a mixture of 30–60 mesh granular silicon carbide and 30 mesh granular tin in the proportions of 20% by weight of tin. The absorber was provided with inlet and outlet pipes at either end. The pipe leading from the other end of the absorber inside the furnace was connected to a closed receiver located outside the furnace. Suitable connections were provided for passing nitrogen through the absorption tube in either direction and through the retort.

A mixture of coke and soda ash was placed in the retort and nitrogen was passed through the apparatus to sweep out the air. The retort and absorber tube then were heated to about 1100° C., which resulted in a flow of carbon monoxide from the end of the absorber extending out of the furnace. During this time, a slow stream of oxygen-free nitrogen was passed through the system, co-current with the reaction products. After a time, the carbon monoxide leaving the absorber burned with a yellow flame, indicating the presence of sodium. The reaction in the retort then was stopped by cooling the retort to a temperature below 1050° C., while the nitrogen flow was continued a few minutes to sweep out residual carbon monoxide, the temperature of the absorber being maintained at about 1100° C.

Then, while maintaining the absorber temperature at the same temperature, nitrogen was passed through the absorber in the reverse direction, causing a mixture of nitrogen and sodium vapor to flow out through the pipe connected to the end of the absorber inside the furnace. The sodium condensed in the portion of this pipe between the furnace and the receiver, and molten sodium was collected in the receiver.

The above cycle then was repeated. The data for the two cycles of operation were:

Charge to retort:
    Coke (200 mesh)_____ 72 grams.
    Soda ash_____ 159 grams.
Sodium metal collected in receiver_____ 5.4 grams.
Retort volume_____ 25 cu. in.
Absorber tin-SiC packing:
    1.5 in. diameter x 7 in. long.
    Tin_____ 120 grams.
    SiC_____ 480 grams.
Temperatures:
    Retort (during reaction)__ 1070 to 1110° C.
    Absorber (continuously)__ 1100 to 1125° C.
Operation, 2 cycles:
    Total reaction time_____ 100 minutes.
    Total time to remove residual CO_____ 13 minutes.
    Total desorption time_____ 100 minutes.

*Example 2*

A quantity of 20 mesh granular silicon carbide and 20 mesh granular tin in the proportions of 20% by weight of tin were moistened with methanol and thoroughly mixed by tumbling in a cylindrical container. The mixture was placed in an "Alundum" (fused alumina) container located in a nickel alloy outer container which in turn was mounted inside a furnace and means were provided to pass gas through the mixed granular material. The depth of the silicon carbide-tin bed was 16". A current of warm air was passed through the silicon carbide-tin mixture to evaporate off the methanol. Nitrogen was then passed through to displace the air and the silicon carbide-tin absorption bed then was heated up to a temperature of 1100 to 1150° C. A mixture of sodium vapor and nitrogen at a temperature of 1100 to 1150° C. then was passed through the absorption bed for a short period of time, after which nitrogen free from sodium vapor was passed through at the same temperature for somewhat longer time. These gases passed through the absorption bed downwardly and the bottom gas outlet of the absorption bed was connected to a condenser and sodium receiver of conventional design. This cycle of operations was repeated for a number of times with the following results:

| Trial | No. of Cycles | Time in Min. | | Na. Recovered per Cycle g | Calc. Percent Na in Tin Bed | Efficiency, Percent | Vol. Ratio Na/N$_2$ |
|---|---|---|---|---|---|---|---|
| | | Absorb | Desorb | | | | |
| A | 5 | 15 | 30 | 1.26 | 1.97 | 100 | 0.274 |
| B | 4 | 20 | 40 | 2.62 | 4.10 | 100 | 0.427 |
| C | 3 | 30 | 60 | 2.17 | 3.42 | 100 | 0.235 |
| D | 2 | 40 | 80 | 4.43 | 6.95 | 93.6 | 0.387 |

In practicing our invention, the reaction between the carbon and soda ash may be carried out in the conventional manner, for example, by heating in an iron or steel retort. Preferably stoichiometric or nearly stoichiometric proportions are used, and preferably the ingredients are finely divided (e. g., 50 to 200 mesh) and premixed before charging to the retort. If desired, caustic soda, or a mixture of caustic soda and soda ash may be used in place of the soda ash. Various forms of amorphous carbon may be used, e. g., coke or charcoal. Preferably, the reaction ingredients are conventionally pretreated to remove moisture and other volatiles, for example, volatile organics in charcoal.

The reaction temperature is in the neighborhood of 1100° C., and not lower than 1050° C. If desired, the temperature may be carried to 1200° C. and even higher, but generally there is no advantage in exceeding 1150° C.

The molten tin serving to absorb sodium from the reaction off-gas must be maintained at a temperature of 900 to 1200° C. and the reaction off-gas temperature must not fall below 900° C. during its passage from the reaction retort and its contact with the molten tin. At temperatures below 900° C. the carbon monoxide-sodium reversion reaction tends to occur. At temperatures above 1200° C., the tin does not effectively absorb the sodium. The best results generally are obtained at reaction and absorption temperatures of 1100 to 1150° C., with substantially no cooling of the reaction off-gas.

Preferably the sodium is removed from the molten tin when sufficient sodium is absorbed to form an alloy containing 1 to 7% by weight of sodium. Desorption effected when the sodium content falls below about 1% generally is uneconomical. Absorption carried to above about 7% sodium content in the alloy usually results in incomplete removal of the sodium from the reaction off-gas.

The molten tin absorption system may be constructed and operated in various ways in accordance with conventional engineering practice for contacting a gas with a liquid, limited only by the above stated temperature requirements and the chemical and physical properties of the materials handled. One method consists in passing the reaction gases over one or more shallow pools of molten tin. Alternatively, the tin may flow, either cocurrently or counter-currently to the flow of reaction off-gas, either as a substantially horizontal stream, or substantially vertically, as in a packed or baffled scrubbing tower. Or, in another method, the reaction off-gas may be passed horizontally in contact with down-flowing streams or droplets of molten tin. In all these methods, the temperature of the molten tin and the gases must lie within the range of 900 to 1200° C., to prevent the reversion reaction.

A preferred method for making this tin absorption bed comprises mixing refractory granules or particles with granules or particles of solid tin at a temperature below the melting point of tin (e. g., at atmospheric temperature) in the desired proportions, so as to form a mass of refractory granules having distributed substantially uniformly throughout small granules of solid tin. This mixture is then packed in a suitable container provided with gas inlet and outlet means arranged to pass a gas through the bed of granular material in the container. When the bed of granular material is heated to above the melting point of tin, the tin granules are converted to tin droplets distributed throughout the bed.

For efficient operation, it is desired to have the tin content of the absorption bed as high as possible but not so high as to cause the drops of tin to coalesce; for if coalesced masses of tin become too large, much of the tin will be lost by gravity flow from the bed. To avoid this occurrence, generally the amount of tin in the absorption bed should not exceed about 25% by weight. Preferably, the absorption bed will be composed of refractory material of 4 to 50 mesh size, containing tin droplets not exceeding about 4 mesh size in a proportion of from 1 to 20% by weight of tin in the bed.

In one method for the preparation of the mixture of tin and refractory granules, the granular mixture is first wet with a volatile liquid such as water, methanol, hydrocarbon oil or the like and the wet granules then are mixed together by conventional mixing means, for example, tumbling in a horizontal cylindrical rotating container until thorough mixing has been obtained, after which warm air or other suitable gas may be passed through the mass to remove the volatile liquid. Preferably, the mixture is packed in the container in which it is to be used as an absorption bed before removal of the volatile liquid. The function of the volatile liquid is to cause slight adherence of the tin and refractory granules to each other so as to compensate for the difference in specific gravity between the tin and refractory which otherwise tends to cause segregation of the tin when the mass is stirred or tumbled.

Other methods of forming the absorption bed may be utilized, for example, mixing the refractory material with molten tin and agitating the mixture while cooling to form tin granules in situ. However, the best results generally are secured by mixing the granular refractory with tin particles below the melting point of tin. The solid tin particles thus mixed with the refractory may vary in size from fine powders on the order of 100 to 200 mesh size up to granules of 4 mesh size, resulting in droplets of molten tin of approximately the same size.

While silicon carbide is the preferred refractory material, other refractories which are chemically inert to the gas mixture (carbon monoxide and sodium vapor) and to tin at the operating temperature and which are sufficiently refractory in nature may be utilized in place of silicon carbide. A sufficiently refractory material is one which does not melt or decrepitate at the operating temperature. It is essential, however, that the refractory material be one whose surfaces is not readily wet by molten tin. The success of the operation depends upon maintaining the tin droplets as discrete drops distributed throughout the mass of granular refractory; and this condition will not prevail if the molten tin wets the surface of the refractory granules to any considerable extent. Examples of refractories other than silicon carbide which may be utilized in the practice of the invention are alumina and graphite.

While tin of relatively high purity is generally to be preferred, relatively low grade tin, e. g., containing as high as 10% of impurities (whether metallic or non-metallic) generally can be used effectively in the absorption bed.

The construction of the absorber (wherein the reaction off-gas is contacted with molten tin) preferably should be such as to avoid or minimize contact of molten tin with iron or steel. At the temperature employed, tin tends to alloy with iron to some extent, contributing to a short life of the equipment. For example, in contacting the gases with pools of molten tin, the latter may be held in shallow graphite containers, enclosed in an insulated steel or iron shell. Graphite also is preferably used as lining and packing for absorption towers. If the refractory-tin granular absorption bed is employed, it may be confined in a steel or iron shell (preferably suitably insulated against heat loss), but the life of such equipment is prolonged by lining the shell with graphite, silicon carbide or other refractory which will prevent contact of tin with the iron or steel shell. The reaction retort and the conduit leading from the retort to the absorber may be made of iron or steel. Scale-resistant alloys may well be used for external parts of equipment exposed to furnace combustion gases.

Means for applying heat to the retort and absorber, and means for conducting the gases may be constructed according to conventional chemical engineering practice. Any mode of construction, however, must be adapted to maintain the temperature of the reaction off-gases at a temperature not lower than 900° C., and preferably not lower than 1100° C. throughout their travel from the reaction in the retort through the absorber. After passing through the absorber, the residual gas is mainly carbon monoxide, substantially free from sodium vapor, and may be cooled or otherwise disposed of as desired. For example, this carbon monoxide off-gas may be utilized with or without cooling, as fuel to heat the retort and absorber.

The absorption capacity of the absorber will depend upon the amount of tin therein. The absorber may be made sufficiently large to absorb the entire sodium production from a single retort charge. Alternatively, the absorber capacity may be a fraction of the production of the retort charge, in which case, two or more absorbers may be employed, diverting the reaction off-gases from one to another. Then, while one absorber is absorbing sodium, sodium may be removed from another by passing through nitrogen.

In place of nitrogen, we may use other gases inert to sodium to remove sodium from the molten tin, for example, argon, helium or the like. Nitrogen is preferred for economic reasons.

While the invention preferably is operated as above described to produce metallic sodium, it is not restricted thereto. If desired, the process may be employed to produce a tin alloy containing up to 7% of sodium. Also, if operated to desorb sodium from the molten tin, the resulting mixture of nitrogen and sodium vapor may be fed into contact with appropriate reagents by conventional procedures to produce valuable sodium compounds such as sodium oxides, sodium hydride, sodium cyanamide and sodium cyanide.

While the invention has been illustrated by utilizing the granular absorptive bed to remove sodium vapor from gas mixtures, the invention is not restricted to this particular modification. The absorptive bed also may be used to absorb the vapors of other metals. The absorptive bed is operable for removing metallic vapors at temperatures up to 1200° C. At higher temperatures tin begins to volatilize from the bed in excessive amounts. The bed is hence suitable for the absorption of the vapor of any metal having a boiling point below 1200° C. at the operating pressure and which will alloy with tin. Generally the operating pressure will be about one atmosphere, but higher or lower pressures may be used if desired. Generally the best results are obtained in the absorption of the vapors of metals which have boiling points of about 500 to 1000° C. at atmospheric pressure. As the operating temperature must be above the melting point of the tin, the boiling point of the metal to be absorbed must be higher than said melting point. Examples of metals which may be absorbed in the bed are listed below together with their atmospheric boiling points:

| Metal: | Boiling point °C. |
|---|---|
| Sodium | 880 |
| Potassium | 760 |
| Mercury | 357 |
| Arsenic | 615 |
| Cadmium | 778 |
| Zinc | 907 |
| Barium | 1140 |
| Magnesium | 1110 |

In all cases in the practice of the invention the temperature of the bed and the gas mixture passed therethrough will be maintained above the boiling point of the metal whose vapor is to be absorbed and above the melting point of tin but not higher than about 1200° C. Thus, for absorption of sodium, the temperature may be from about 900 to 1200° C., preferably 1050° to 1150° C.

While an operating pressure of approximately one atmosphere is generally to be preferred, the invention is not restricted thereto. If desired, higher or lower pressures may be employed, provided that the boiling point of the metal to be absorbed at the operating pressure is below 1200° C.

The invention may be utilized to separate a plurality of metal vapors as well as a single metal vapor. For example, a gaseous mixture containing both sodium and potassium vapors may be treated by our method to remove the alkali metal components of the mixture.

The container for the absorptive bed preferably should be constructed of material having properties similar to that of the granular refractory. While generally any material which will have the requisite mechanical strength at the operating temperature and which is substantially chemically inert to the constituents of the gas mixture to be treated may be utilized for constructing or lining the container, it is preferable that the interior surface of such container be a material which is not readily wetted by tin. It is also generally preferable to suitably insulate the container to prevent heat loss, so as to more readily maintain the desired operating temperature.

It is, of course, essential that the non-metallic components of the gas mixture to be treated be substantially free from substances which would react irreversibly with tin at the operating temperature to form tin compounds. However, in almost all cases, the gas mixture could not contain such substances, as they would react with the metallic component of the gas mixture.

The capacity of the absorptive bed for the absorption of metallic vapors will depend upon the nature of the metal absorbed, since the capacity will vary depending upon the melting point curve of the resulting tin alloy. The absorption activity of the bed depends upon maintaining the tin droplets and resulting tin alloy droplets in liquid form and operating at a temperature not higher than 1200° C. to avoid volatilization of tin. These alloy properties will vary more or less for different metals to be absorbed. For example, the bed will absorb from about 1 to 7% by weight of the tin therein.

We claim:

1. The metallic vapor separation process which comprises passing a gaseous mixture containing the vapor of an alkali metal, the boiling point of which lies between the melting point of tin and 1200° C. at the operating pressure, through a stationary bed of a granular refractory material substantially infusible at the operating temperature and substantially chemically inert to the components of said mixture and to tin, said bed having distributed therethrough a plurality of droplets of molten tin, at a temperature between the boiling point of said metal and 1200° C. and thereby absorbing said metal in the tin.

2. The metallic vapor separation process which comprises passing a gaseous mixture containing the vapor of an alkali metal, the boiling point of which is about 500 to 1000° C. at atmospheric pressure, through a stationary bed of a granular, refractory material substantially infusible at the operating temperature and substantially chemically inert to the components of said mixture and to tin, said bed having distributed therethrough a plurality of droplets of molten tin, at a temperature between the boiling point of said metal and 1200° C. and thereby absorbing said metal in the tin.

3. The process for separating sodium vapor from a gaseous mixture of sodium vapor and non-metallic substances in the vapor phase which comprises passing said mixture, at a temperature of about 900 to 1200° C. through a stationary bed of a granular, refractory material, substantially infusible and chemically inert to sodium and the other constituents of said mixture at said temperature, said bed having distributed therethrough a plurality of droplets of molten tin, and thereby absorbing the sodium in the tin.

4. The process of claim 3 wherein said refractory material is 4 to 50 mesh silicon carbide and the tin content of said bed is 1 to 25% by weight and the operating temperature is 1100 to 1200° C.

5. The process which comprises passing a gaseous mixture containing sodium vapor through a stationary bed of a granular refractory material substantially infusible at the operating temperature and substantially inert to the components of said mixture and to tin, said bed having distributed therethrough a plurality of droplets of molten tin, at a temperature between the boiling point of sodium and 1200° C. and thereby absorbing sodium in the tin, then passing through said bed a metal-free gas substantially chemically inert to sodium at a temperature between the boiling point of sodium and 1200° C. and cooling the resulting mixture of said metal-free gas with sodium vapor to condense sodium from the mixture.

6. The process of claim 5 wherein the bed is composed of 4-50 mesh granular silicon carbide mixed with 1-25% by weight of tin droplets.

7. The process of claim 5 wherein the absorption temperature is maintained at 1100-1200° C.

8. The process of claim 5 wherein the metal-free gas contains carbon monoxide.

9. The process of claim 5 wherein the sodium is absorbed in the tin to form an alloy therewith containing about 1-7% sodium.

10. In the process of preparing metallic sodium by the reaction between sodium carbonate and carbon at an elevated temperature, the steps of absorbing sodium from the vapors produced by said reaction in small droplets of tin held within an inert porous refractory bed and subsequently recovering sodium from the tin.

11. The process of claim 10 in which the inert porous refractory bed is formed of 4–50 mesh granular silicon carbide.

12. The process of claim 11 in which the tin droplets weigh 1–25% as much as the silicon carbide.

References Cited in the file of this patent

UNITED STATES PATENTS

| Number | Name | Date |
|---|---|---|
| 1,546,833 | Gieger | July 21, 1925 |
| 2,100,354 | Pier | Nov. 30, 1937 |
| 2,391,728 | McConica, 3d et al. | Dec. 25, 1945 |
| 2,467,144 | Mochel | Apr. 12, 1949 |
| 2,533,021 | Krchma | Dec. 5, 1950 |

FOREIGN PATENTS

| Number | Country | Date |
|---|---|---|
| 4,308 | Great Britain | 1874 |